UNITED STATES PATENT OFFICE.

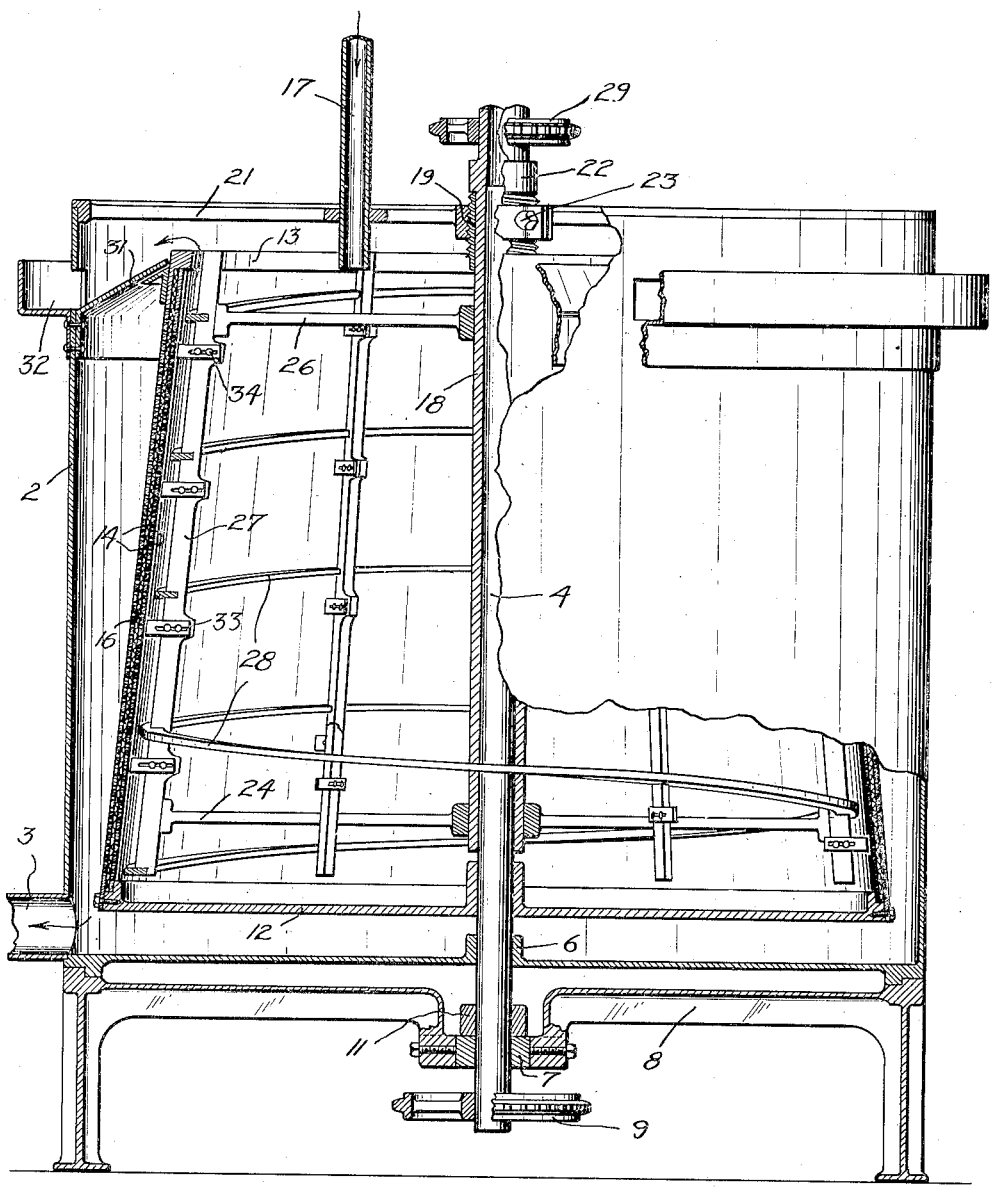

THOMAS H. PARKER, OF OAKLAND, STEPHEN G. GASSAWAY, OF BELVEDERE, AND JOHN W. WHITSON, OF SAN FRANCISCO, CALIFORNIA; SAID WHITSON ASSIGNOR TO SAID PARKER AND SAID GASSAWAY.

CENTRIFUGAL FILTER.

1,410,264.  Specification of Letters Patent.  Patented Mar. 21, 1922.

Application filed January 12, 1920. Serial No. 351,033.

*To all whom it may concern:*

Be it known that we, THOMAS H. PARKER, STEPHEN G. GASSAWAY, and JOHN W. WHITSON, citizens of the United States, and residents, respectively, of Oakland, Alameda County, Belvedere, Marin County, and the city and county of San Francisco, all in the State of California, have invented a new and useful Centrifugal Filter, of which the following is a specification.

Our invention relates to continuous filters or clarifiers for separating solids from liquids by the action of centrifugal force, and one of the objects of our invention is to provide an apparatus in which the accumulating unfilterable material is mechanically discharged simultaneously with the centrifugal separation therefrom of the filtrate.

Another object of the invention is the provision of a filter in which the filtering material is composed partly of a layer or bed of constant depth and composed of the unfilterable content of the mixture, and which is constantly being renewed.

The invention possesses other features of advantage, some of which, with the foregoing, will be set forth in the following description of the preferred form of our invention which is illustrated in the drawings accompanying and forming part of this specification. It is to be understood that we do not limit ourselves to the showing made by the said drawings and description, as we may adopt variations of the preferred form within the scope of our invention as set forth in the claims.

The figure of the drawings is an elevation partly in section showing our filter.

Our filter comprises a cylindrical casing 2 adapted to receive the filtrate and provided with a discharge passage 3 therefor. A shaft 4 is journaled in bearings 6 arranged in the bottom of the casing and in bearings 7 disposed on the base plate 8 on which the casing 2 rests. A sprocket 9 on the lower end of the shaft 4 provides means for rotating the shaft from any convenient source of power. The downward thrust of the shaft is carried by the flange 11.

Arranged within the casing 2 is a drum having a bottom wall 12 fixed on the shaft 4. The lateral wall of the drum is slightly conical in form sloping inwardly to a discharge rim 13 at the top. The lateral wall of the drum comprises two foraminated plates 14 spaced on each side of a filter membrane 16 which is held between the double wall so formed. In some instances, only a single foraminated plate may be used, with or without the filter membrane disposed on its inner surface. Material to be filtered is introduced into the drum through the pipe 17.

Means are provided for mechanically removing unfilterable material from said drum, which accumulates therein in excess of a layer of predetermined thickness which is allowed to remain on the foraminated lateral wall as an additional filtering material or filter bed. This removing means operates constantly while the apparatus is running and simultaneously with the passage of the filtrate through the filter bed and the foraminated plates. The upper end of the shaft is enclosed within the sleeve 18 rotatably arranged thereon and journaled within the bearing collar 19, which is threaded within the split hub of the spider 21 fixed on the top of the casing 2. The downward vertical thrust of the sleeve is carried by the flange 22 resting on the adjustable collar 19 so that the sleeve may be adjusted vertically by turning the collar which is then held in adjusted position by tightening the screw 23 which contracts the split hub. Arms 24 are fixed radially on the sleeve at the lower end thereof and shorter arms 26 are similarly arranged near the top. To these arms are fixed bars 27 equally spaced from the inside surface of the drum at top and bottom. On the bars 27 is spirally disposed a blade 28, the outer edge of which sweeps the inside of the drum clearing the surface by an amount determined by the vertical adjustment of the collar 19, when the sleeve is rotated by the sprocket 29 adapted to be driven from any convenient source of power. The sleeve 18 is driven in the same direction as the shaft 4 but at a different speed, so that the spiral blade effects a slow movement of the unfilterable material toward the discharge rim 13 of the drum. By revolving the blade and the drum in the same direction and at different speeds, the feeding action of the blade may be secured without creating violent agitation in the mixture being treated. It will of course be understood that the drum must be rotated at a speed sufficient to drive the filtrate through the filter bed and membrane of the drum.

When the mixture is fed into the rotating drum, a layer of the unfilterable content is built up on the lateral wall of the drum the thickness of the layer being determined by the spacing of the spiral blade, in turn determined by the adjustment of the collar 19. Accessions of unfilterable material in excess of that comprising the filtering layer are gradually worked to the top by the spiral blade and discharged over the rim 13, falling upon the conically formed apron 31 arranged in the top of the casing, and opening through suitable passages in the casing wall upon the launder 32, from which the unfilterable material is removed by any suitable means. Accompanying the continuous, mechanically induced movement of the unfilterable material toward the discharge rim of the drum, is the centrifugal discharge through the foraminated lateral wall of the drum of the filtrate, which falls into the bottom of the casing 2 and is discharged therefrom through the passage 3.

Means are provided for agitating or stirring the material comprising the filter bed to prevent clogging and facilitate the passage therethrough of the filtrate. Stirring blades 33 are adjustably arranged at suitable intervals upon the bars 27, projecting radially therefrom beyond the sweep of the spiral blade so as to stir up the material comprising the filtering bed. Screws 34 through slots in the blades permit radial adjustment of the blades to vary the penetration of the blades into the filter bed. Thus the filter bed is constantly being agitated and renewed, new material being added and old material displaced to be caught by the spiral blade and carried to the top.

We claim:

1. A centrifugal filter comprising a conical drum having a foraminated lateral wall, a spirally disposed blade arranged adjacent the surface of said drum, means for rotating said drum and said blade in the same direction at different speeds, means for feeding material to be filtered into said drum, and means for adjusting the relative positions of said drum and blade to vary the distance therebetween.

2. A centrifugal filter comprising a conical drum having a foraminated lateral wall, a spirally disposed blade arranged adjacent the surface of said drum, means for rotating said drum and said blade in the same direction at different speeds, means for feeding material to be filtered into said drum, and means for axially adjusting the position of said blade to vary the distance between the blade and the drum.

3. A centrifugal filter comprising a shaft, a conical foraminated drum fixed for rotation with said shaft, a sleeve rotatably mounted on said shaft, a blade spirally disposed adjacent the inner conical surface of said drum and fixed for rotation with said sleeve, means for axially adjusting the relative positions of said drum and blade, means for rotating said shaft and said sleeve in the same direction at different speeds, and means for feeding material to be filtered into said drum.

4. A centrifugal filter comprising a vertical shaft, a conical foraminated drum fixed for rotation with said shaft, a casing surrounding said drum, a sleeve rotatably mounted on said shaft, a blade spirally disposed adjacent the inner conical surface of said drum and fixed for rotation with said sleeve, means for supporting said sleeve on said casing, means for vertically adjusting said supporting means, means for rotating said shaft and said sleeve at different speeds, and means for feeding material to be filtered into said drum.

5. A centrifugal filter comprising a vertical shaft, a conical foraminated drum fixed for rotation with said shaft, a filtering material disposed in said drum, a casing surrounding said drum, a conical apron within said casing and adjacent the discharge edge of the drum, a flanged sleeve rotatably mounted on said shaft, a blade spirally disposed adjacent the inner conical surface of said drum and fixed for rotation with said sleeve, stirring blades projecting beyond said spiral blade and mounted for rotation therewith, a spider on said casing, a bearing collar interposed between said spider and said flanged sleeve, means for vertically adjusting the collar, means for rotating said shaft and said sleeve at different speeds, and means for feeding material to be filtered into said drum.

6. A centrifugal filter comprising a foraminated drum, a spirally disposed blade arranged adjacent the inner surface of said drum, means for rotating said drum and said blade at different speeds, stirring blades mounted adjustably and for rotation with said spiral blade for continuously stirring the unfilterable material on the surface of said drum, and means for feeding material to be filtered into said drum.

7. A centrifugal filter comprising a foraminated drum, a spirally disposed blade arranged adjacent the inner surface of said drum, means for rotating said drum and said blade at different speeds, stirring blades mounted for rotation with said spiral blade for continuously stirring the unfilterable material on the surface of said drum, means for varying the extension beyond the sweep of said spiral blade of said stirring blades, and means for feeding material to be filtered into said drum.

8. A centrifugal filter comprising a rotatably mounted drum having a foraminated lateral wall and a discharge rim at one end, means for feeding material to be filtered into said drum, means for rotating the drum to drive the filtrate through said foraminated wall, means for continuously stirring the unfilterable material on the wall of said drum to facilitate the passage of the filtrate therethrough and effect the gradual renewal of the unfilterable material and means for mechanically impelling the unfilterable material to the discharge end of the drum.

9. A centrifugal filter comprising a drum having a foraminated lateral wall, means for rotating the drum, means for feeding a mixture to be filtered into said drum, and axially adjustable means for maintaining upon said lateral wall a layer of the unfilterable content of said mixture of constant thickness and for removing from the drum additional accessions of said unfilterable content.

10. The process of filtering material which consists in subjecting the material to the action of centrifugal force to separate the filtrate from the unfilterable material and simultaneously continuously stirring the unfilterable material to facilitate the passage therethrough of the filtrate and removing the unfilterable material.

11. The process of filtering a mixture which consists in creating a filter bed of the unfilterable content of the mixture to be filtered, centrifugally driving the filterable content of the mixture through said filter bed, and coincidently with the centrifugal movement of the filtrate continuously agitating the filter bed and maintaining it at substantially the same depth.

In testimony whereof, we have hereunto set our hands at San Francisco, California, this 2nd day of January 1920.

THOMAS H. PARKER.
STEPHEN G. GASSAWAY.
JOHN W. WHITSON.

In presence of—
H. G. PROST.